(12) United States Patent
Currid et al.

(10) Patent No.: US 8,909,746 B2
(45) Date of Patent: Dec. 9, 2014

(54) SYSTEM AND METHOD FOR OPERATING SYSTEM INSTALLATION ON A DISKLESS COMPUTING PLATFORM

(75) Inventors: Andrew Currid, Alameda, CA (US); Mark A. Overby, Bothell, WA (US)

(73) Assignee: NVIDIA Corporation, Santa Clara, CA (US)

( * ) Notice: Subject to any disclaimer, the term of this patent is extended or adjusted under 35 U.S.C. 154(b) by 1909 days.

(21) Appl. No.: 11/459,892

(22) Filed: Jul. 25, 2006

(65) Prior Publication Data

US 2008/0028035 A1 Jan. 31, 2008

(51) Int. Cl.
G06F 15/177 (2006.01)
G06F 9/44 (2006.01)
H04L 29/06 (2006.01)

(52) U.S. Cl.
CPC .............. G06F 9/4416 (2013.01); *H04L 63/126* (2013.01)
USPC ................................ 709/222; 713/2; 711/118

(58) Field of Classification Search
CPC ... G06F 9/4416; G06F 9/4406; G06F 9/4401; G06F 11/1417; G06F 9/4403; G06F 12/0864; H04L 41/0806; H04L 29/08981
USPC ........................................................ 709/222
See application file for complete search history.

(56) References Cited

U.S. PATENT DOCUMENTS

| | | | |
|---|---|---|---|
| 5,671,355 A | 9/1997 | Collins | |
| 6,466,972 B1 * | 10/2002 | Paul et al. | 709/222 |
| 6,519,698 B1 | 2/2003 | Leyda et al. | |
| 6,598,159 B1 * | 7/2003 | McAlister et al. | 713/2 |
| 7,062,550 B1 * | 6/2006 | Hutchinson et al. | 709/224 |
| 7,266,679 B2 | 9/2007 | Martinez | |
| 7,302,487 B2 | 11/2007 | Yionen et al. | |
| 7,360,072 B1 * | 4/2008 | Soltis et al. | 713/2 |
| 7,363,514 B1 * | 4/2008 | Behren | 713/2 |
| 7,373,514 B2 | 5/2008 | Krueger et al. | |

(Continued)

FOREIGN PATENT DOCUMENTS

| | | |
|---|---|---|
| JP | 2003330728 | 11/2003 |
| JP | 2004-295270 | 10/2004 |

(Continued)

OTHER PUBLICATIONS

Office Action. U.S. Appl. No. 11/459,850 dated Jun. 26, 2009.

(Continued)

*Primary Examiner* — Phuoc Nguyen
*Assistant Examiner* — Kishin G Belani
(74) *Attorney, Agent, or Firm* — Patterson & Sheridan, LLP

(57) ABSTRACT

One embodiment of the present invention sets forth a technique for automatically provisioning a diskless computing device and an associated server system. A diskless computing device client incorporates an iSCSI initiator that is used to access resources provided by an iSCSI target that is resident on a server computing device. The iSCSI initiator is implemented in the client firmware, providing INT13 disk services entry points, thereby enabling the client to transparently access virtual storage devices at boot time. The client device conducts an apparently local installation using the virtual storage devices provided by the server computing device. A short signature value is associated with the boot image, uniquely associating the boot image with the specific client hardware configuration. When the client device boots normally, the signature value of the client device is presented to the server computing device to automatically reference the appropriate boot image.

15 Claims, 4 Drawing Sheets

(56) References Cited

U.S. PATENT DOCUMENTS

| | | |
|---|---|---|
| 2001/0052069 A1 | 12/2001 | Sekiguchi |
| 2002/0073186 A1 | 6/2002 | French et al. |
| 2002/0161832 A1 | 10/2002 | Brebner |
| 2002/0191548 A1 | 12/2002 | Ylonen et al. |
| 2003/0065913 A1 | 4/2003 | Cepulis et al. |
| 2004/0019796 A1 | 1/2004 | Wang |
| 2005/0216668 A1* | 9/2005 | Kobayashi et al. ........... 711/118 |
| 2005/0228950 A1 | 10/2005 | Karr |
| 2005/0235361 A1 | 10/2005 | Alkove et al. |
| 2005/0251641 A1 | 11/2005 | Camilli et al. |
| 2006/0069949 A1 | 3/2006 | Hayakawa et al. |
| 2006/0155838 A1 | 7/2006 | Wu et al. |
| 2006/0156129 A1 | 7/2006 | Midgley et al. |
| 2007/0074290 A1 | 3/2007 | Kobayashi et al. |
| 2007/0157051 A1 | 7/2007 | Hernandez et al. |
| 2007/0266027 A1 | 11/2007 | Gattegno et al. |
| 2008/0209019 A1 | 8/2008 | Iszlai et al. |

FOREIGN PATENT DOCUMENTS

| | | |
|---|---|---|
| JP | 2004341578 | 12/2004 |
| JP | 2005276233 | 10/2005 |
| JP | 2005284497 | 10/2005 |
| JP | 2006011506 | 1/2006 |
| JP | 2006048648 | 2/2006 |

OTHER PUBLICATIONS

Final Office Action, U.S. Appl. No. 11/459,850, dated Sep. 9, 2009.
Final Office Action, U.S. Appl. No. 11/459,883, dated Sep. 14, 2009.
English translation of 2004-295270 (provided as explanation of relevance).
Office Action. U.S. Appl. No. 11/459,883 dtd. Feb. 1, 2010.
Office Action, U.S. Appl. No. 11/459,883, dated Jun. 23, 2010.
JPO Office Action, JP Appl. No. 2007-193727, mailed Dec. 21, 2010.
TW office Action, Application No. TW-096127092 dated Mar. 8, 2012.

* cited by examiner

SYSTEM AND METHOD FOR OPERATING SYSTEM INSTALLATION ON A DISKLESS COMPUTING PLATFORM

BACKGROUND OF THE INVENTION

1. Field of the Invention

Embodiments of the present invention relate generally to computer platform provisioning and more specifically to a system and method for operating system installation on a diskless computing platform.

2. Description of the Related Art

In certain computing environments, diskless computing devices offer cost and management advantages over full-featured computing devices. The diskless computing device becomes a client of a server system, which provides software boot images to the client. The server system includes mass storage, such as one or more hard disks, from which operating system (OS) boot images are served to one or more client devices. The server system therefore maintains unique operating system boot images for each unique configuration of hardware represented in the client devices. For example, one client device may include a specific type of graphics controller that uses a specific device driver, while a second client device may include a second type of graphics controller that uses a second type of device driver. In such a case, the server system maintains at least two unique boot images, one for each of the two unique configurations of hardware, determined by the specific type of graphics controller.

In a typical scenario, an organization may acquire some number of diskless computing devices to satisfy current computing requirements. Over time, some of the devices may fail and need to be replaced. Identical replacements are not always available, so newer devices may be substituted for the older devices. The organization may also grow and acquire many new devices, which may or may not be identical to the older devices. Furthermore, organizations may implement "refresh" programs in which some number of older devices are replaced en masse with newer devices. The result of replacing or adding diskless computing devices in a typical deployment is that the operating set of diskless computing devices inevitably includes many different unique hardware configurations. Each unique hardware configuration includes a unique combination of components and boots from a unique boot image that includes, among other things, the device drivers required for that unique hardware configuration. Importantly, the different unique hardware configurations of the diskless computing devices across an organization must each have a unique boot image stored on the server system for the diskless computing devices to work effectively.

When operating systems such as Microsoft Windows® are installed on a given device, information about existing hardware components and related configuration data is extracted from the device in order to properly select drivers for the various hardware components present in the device. Once the hardware configuration is successfully probed and drivers are selected, the installation program configures a unique boot image of the operating system for that specific hardware configuration. To generate a new boot image for a new diskless computing device hardware configuration, the operating system is typically installed manually on a special, stand-alone instance of the diskless computing device that includes both a hard disk and an optical media (i.e., CD or DVD) reader. Once the installation is complete, the boot image generated on the special instance of the diskless computing device is manually captured and transferred to the server system. Each diskless computing device designated as a client of the server system is then manually configured to reference the appropriate boot image on the server system so that the diskless computing devices can boot from these boot images. Thus, when a new diskless computing device hardware configuration is introduced into the mix of diskless computing devices, system administration personnel must be engaged to manually generate a new boot image for the new hardware configuration and to manually configure the new diskless computing device to boot from its associated boot image. This process is not only time consuming and expensive, it also is prone to human error.

As the foregoing illustrates, what is needed in the art is a more efficient technique for setting up diskless computing devices and their associated server systems.

SUMMARY OF THE INVENTION

One embodiment of the present invention sets forth a technique for automatically provisioning a diskless computing device and an associated server system. A diskless computing device client incorporates an iSCSI initiator that is used to access resources provided by an iSCSI target that is resident on a server computing device. The iSCSI initiator is implemented in the client firmware, providing INT13 disk services entry points, thereby enabling the client to transparently access virtual storage devices at boot time. The client device conducts an apparently local installation using the virtual storage devices provided by the server computing device. A short signature value is associated with the boot image, uniquely associating the boot image with the specific client hardware configuration. When the client device boots normally, the signature value of the client device is presented to the server computing device to automatically reference the appropriate boot image.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
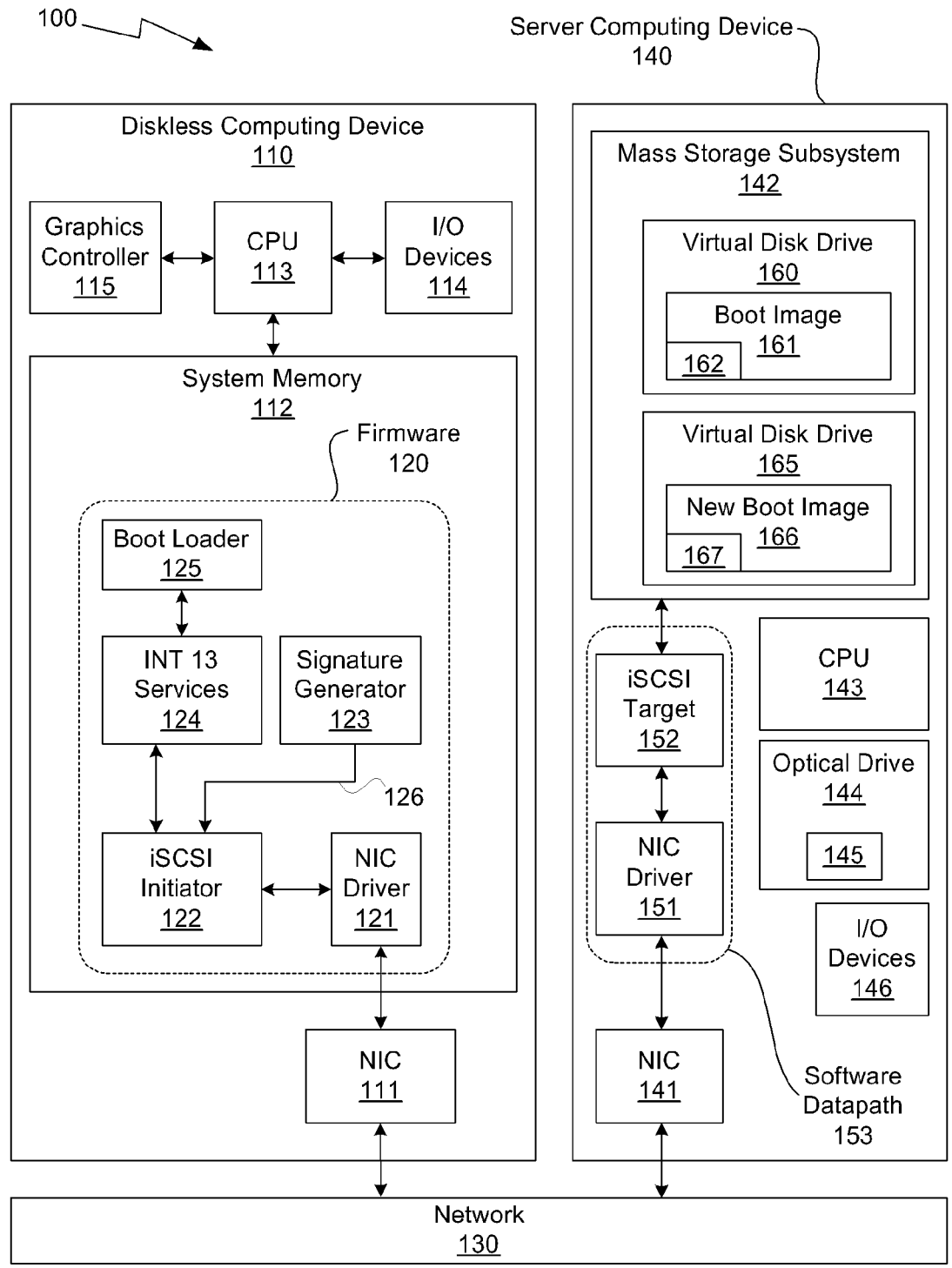
FIG. 1 is a conceptual diagram of a system that includes a diskless computing device connected to a server computing device through a network, according to one embodiment of the invention.

A typical computing device includes firmware, which executes locally on the device. A system boot chronology defines steps for booting the system and transferring execution control to the operating system. Certain steps are generic, such as power on self test, while other steps may be specific to a given operating system. After power-on, configuration, self-test and diagnostics are completed, a module of code referred to as a "boot loader" executes. The boot loader performs the task of loading another loader program called the "operating system loader" into system memory for execution. The operating system loader is part of a boot image, which typically resides on boot media such as a hard disk, optical disk, or floppy disk. The operating system loader is read from a set of well-known storage blocks included in the boot image. For example, the operating system loader may always start at storage block zero, regardless of which operating system is loaded, and occupy a fixed number of fixed size (typically 512-byte) disk blocks.

A standard personal computer (PC) architecture based on an Intel® x86 processor incorporates the boot loader and a set of storage device access routines referred to in the art as "INT13 disk services entry points," or simply "INT 13 services." When a hard disk is present, the INT 13 services provide the interface to a block storage boot device, such as an IDE or SCSI disk drive, before the operating system has actually booted.

The INT 13 services are important in establishing a baseline capability to boot a computer regardless of the unique driver needs of the specific storage devices used by the computer. For example, a new hard disk drive may require a new driver to fully access a new set of features developed subsequently to the firmware existing within the computer. Despite the new features, the new hard disk drive still responds to the basic set of block read operations defined by the INT 13 services. In this way, the hard disk drive enables the computer to boot by providing basic access to the well-known block addresses containing the operating system loader. After the initial operating system code is loaded by the operating system loader, the necessary device drivers are loaded, giving the operating system full access to the various features of the computer's hardware.

When a modern operating system such as Microsoft Windows® is initially installed, a certain minimum set of hardware components is assumed to be in place, enabling basic installation functionality. Part of the installation process includes probing for the presence of additional hardware elements, such as high-function graphics controllers, network interface controllers (NICs) and other I/O controllers, that exist within the computer. If additional hardware components are found, drivers for these components are loaded from either a library of drivers maintained by the operating system or from a user-specified location, such as an optical disk or floppy disk. When hardware is added or removed between operating system boots, the operating system adjusts accordingly. New drivers are loaded for newly-added hardware components and existing drivers are disabled for newly-removed hardware. Each time the operating system detects a change in the computer's hardware configuration, a new boot image is dynamically updated to replace the previous boot image. Each newly installed or updated boot image includes a cached set of drivers and a manifest of installed hardware and configuration information. By caching the hardware configuration and driver installation information in the boot image, the operating system is able to boot quickly and efficiently when no hardware configuration changes are made between successive boots of the operating system.

The hardware configuration of a particular diskless computing device rarely, if ever, changes. Thus, the strategy of creating a cached boot image, commonly employed by modern operating systems, may be exploited to efficiently automate the process of installing diskless computing devices. As described below in conjunction with FIG. 1-4, each newly installed boot image is saved to a server computing device for subsequent sessions of booting diskless computing devices. The association between a given diskless computing device and an appropriate boot image is established through a relatively short signature value computed using a specific set of hardware system configuration data. The signature value is presented as part of an iSCSI login command process and determines whether a particular diskless computing device is or is not a member of a given class of hardware. All members of a specific class of hardware may boot from the same boot image.

FIG. 1 is a conceptual diagram of a system 100 that includes a diskless computing device 110 connected to a server computing device 140 through a network 130, according to one embodiment of the invention. The diskless computing device 110 includes a central processing unit (CPU) 113, graphics controller 115 and input/output (I/O) devices 114, which may include, without limitation, a serial port controller, a parallel port controller, a USB controller, a keyboard and a mouse. The CPU 113 is connected to a system memory 112, which includes dynamic random access memory (DRAM) and may include non-volatile memory, such as programmable read only memory PROM or flash memory. Firmware 120, described in greater detail below, resides within system memory 112. During operation, Firmware 120 may execute from one or more type of memory such as PROM, flash memory, or DDR memory, as appropriate. The diskless computing device 110 also includes a NIC 111 to interface with the network 130, such as an Ethernet network.

The firmware 120 includes, without limitation, a boot loader 125, INT 13 services 124, a NIC driver 121, a signature generator 123 and an iSCSI initiator 122. The NIC driver 121 configures and manages the NIC 111. The boot loader 125 may be a single module of code, or a sequence of modules of code, used to load an operating system loader from a block storage device such as a hard disk, as part of the boot process. The INT 13 services 124 provide basic access to the block storage, allowing the diskless computing device 110 to load and execute operating system-specific loader code tailored to the specific requirements of loading a particular operating system. As described in greater detail herein, the iSCSI initiator 122 logs into a virtual disk drive present within the server computing device 140 and presents the boot loader 125 with INT 13 access to the virtual disk drive and the boot image contained therein.

The signature generator 123 computes the signature value 126 unique to the specific configuration of hardware present in the given diskless computing device 110. The function of the signature generator 123 is described in greater detail the co-pending application entitled "Method to Accelerate Identification of Hardware Platform Classes," filed on Jul. 25, 2006. Importantly, each signature value is guaranteed to be unique to a specific configuration of hardware. That is, no two different hardware configurations may share the same signature value. As also described in greater detail herein, the signature value 126 is used by the iSCSI initiator 122 in the iSCSI login process to uniquely identify which boot image stored on the server computing device 140 should be associated with and downloaded to the diskless computing device 110.

The server computing device 140 includes, without limitation, a NIC 141, a mass storage subsystem 142, a CPU 143, an optical drive 144, I/O devices 146. The NIC 141 provides an interface to network 130. The mass storage subsystem 142 may include one or more hard disk drives acting independently or configured in one or more RAID arrays. Alternately, the mass storage subsystem 142 may be implemented using a storage area network (SAN) or network attached storage (NAS) subsystem. The optical drive 144 may include, for example, a CD or DVD drive. When an installation CD or DVD is present in the optical drive 144, an installation image 145 is available. The set of I/O devices 146 may include, without limitation, a graphics controller, a serial port controller, a parallel port controller, a USB controller, a keyboard and a mouse.

As shown, the server computing device 140 also has software datapath 153 that includes a NIC driver 151 configured to provide management of the NIC 141 and an iSCSI target 152 configured to provide clients, such as the iSCSI initiator 122 of the diskless computing device 110, access to a virtual disk drive 160 residing within the mass storage subsystem 142 that contains a boot image 161. The boot image 161 is suitable to boot the diskless computing device 110 and includes an operating system loader 162. A virtual disk drive 165 may also be allocated within the mass storage subsystem 142 to provide storage for a new boot image 166. The new boot image 166, once configured, contains an operating system loader 167. The iSCSI target 152 is capable of parsing out the signature value 126 presented in the iSCSI login command transmitted from the iSCSI initiator 122 to the iSCSI target 152. As described in greater detail herein, if the signature value 126 is recognized, an association between the diskless computing device 110 and the virtual disk drive 160 is established so that the boot image 161 can be accessed by the diskless computing device 110 for boot. However, if the signature value 126 is not recognized, then access to the new boot image 166 within the virtual disk drive 165 is provided to the diskless computing device 110 to generate a boot image that may then be associated with the signature value 126.

In one embodiment of present invention, the diskless computing device 110 is based on a standard PC architecture and therefore incorporates a set of modules in firmware 120, that may function substantially similarly to standard PC firmware. The boot loader 125 there loads the operating system loader 162 into system memory 112 via INT 13 services conducted by the iSCSI initiator 122. The iSCSI initiator 122 therefore serves as the block device presented to the INT 13 services 124. A TCP/IP protocol stack is implemented either in the iSCSI initiator 122 or NIC driver 121, as dictated by the constraints of implementation. In an alternate embodiment, the TCP/IP protocol stack associated with the iSCSI protocol may be incorporated in the NIC 111.

As previously mentioned, during the iSCSI login process, the iSCSI target 152 attempts to match the signature value 126 included in the iSCSI command against known signature values that correspond to existing boot images stored within the server computing device 140. In the event of a match, the appropriate virtual disk drive, such as virtual disk drive 160, is connected to the iSCSI initiator 122 and the boot image corresponding to the recognized signature value 126, such as boot image 161, is presented to the boot loader 125 via INT 13 services 124. If the signature value 126 has no known match, the iSCSI target 152 presents the installation image 145 of an operating system installer to the diskless computing device 110. As described in greater detail below, a new boot image 166 is generated within the initial disk drive 165 provided by the server computing device 140 in conjunction with the standard installation process. In an alternate embodiment, instead of residing on the optical disk drive 144, the installation image 145 may reside on a virtual disk drive within the mass storage subsystem 142, for example, in the form of either raw blocks or as an ISO CD image file.

In one embodiment of the present invention, both the operating system loader 162 and the complete boot image 161 reside in the virtual disk drive 160 within the mass storage subsystem 142. The operating system loader 162 is a program capable of interacting with storage partitions and at least one file systems present in the boot image 161, where operating system elements in the form of standard files are included in the overall boot configuration.

In another embodiment, the iSCSI target 152 of the server computing device 140 may present one of several virtual disk drives 160, 165 to the iSCSI initiator 122. For example, a range of storage blocks residing in the mass storage subsystem 142 of the server computing device 140 may be presented to the iSCSI initiator 122 as an independent mass storage device such as a stand alone hard drive. Furthermore, a file, such as an ISO CD image, may be presented to the iSCSI initiator as an independent mass storage device, such as a CD drive with a CD loaded and ready for access.

In yet another embodiment, the system 100 may include more than one server computing device. In such an embodiment, the virtual disk devices containing the boot images for the different hardware classes of diskless computing device may be distributed across the different server computing devices.

Figure 2:
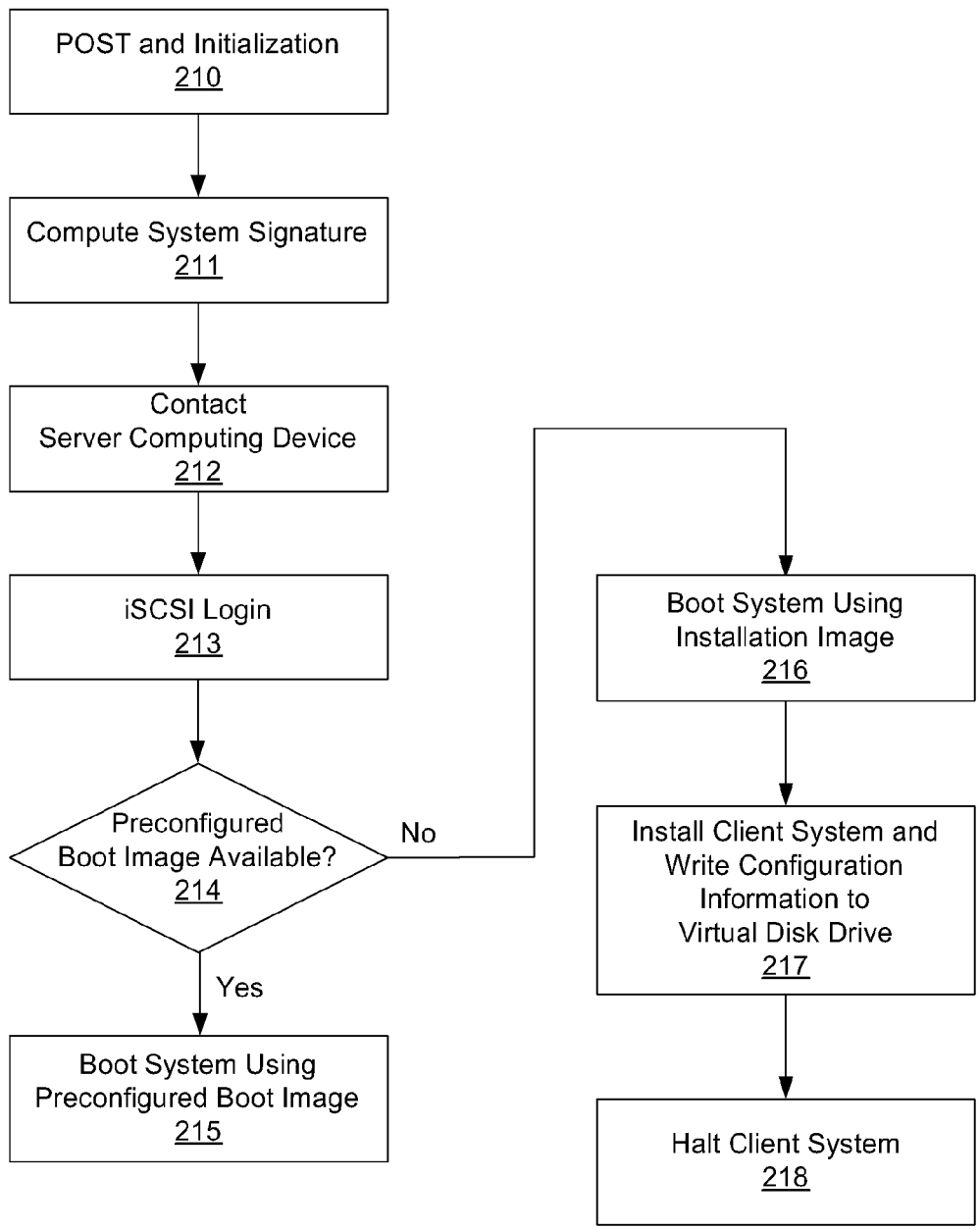
FIG. 2 is a flow diagram of method steps for booting a diskless computing device from a remote iSCSI target, according to one embodiment of the invention.

FIG. 2 is a flow diagram of method steps for booting a diskless computing device 110 from a remote iSCSI target 152, according to one embodiment of the invention. Although the method steps are described in conjunction with FIG. 1, persons skilled in the art will understand that any system that performs the method steps, in any order, is within the scope of the invention.

The method for booting a diskless computing device 110 begins in step 210, where standard system power on self test (POST) and initialization routines are performed by firmware 120 within the diskless computing device 110. After step 210 completes, the system hardware is configured and ready to initiate the boot process. In step 211, the signature generator 123 identifies hardware present on the diskless computing device 110 and computes the signature value 126 according to the specific hardware configuration of the diskless computing device 110. In step 212, the firmware 120 discovers and contacts the server computing device 140 in preparation for the login process. In step 213, the iSCSI initiator 122 performs an iSCSI login to the iSCSI target 152, where the initiator information related to the iSCSI login command includes the signature value 126. In step 214, the iSCSI target 152 attempts to match the signature value 126 parsed from the information transmitted as part of the iSCSI login command. If the signature value 126 is known, and therefore has a corresponding boot image 153, then in step 215, the diskless computing device 110 is booted using a preconfigured boot image stored within the server computing device 140 that corresponds to the signature value 126.

If, in step 214, the signature value 126 is not known, then the method proceeds to step 216, where the diskless computing device 110 is directed, by the iSCSI target 152, to boot from the installation image. In step 217, the diskless computing device 110 proceeds through a normal system installation. With access to virtualized storage, the diskless computing device 110 may complete the installation process, which is performed similarly to how a typical installation procedure employing locally attached optical media and a locally attached hard disk would be performed. Importantly, in conjunction with the installation procedure, the iSCSI initiator 122 writes back to the server computing device 140 all of the configuration information, including data files, necessary to perform a complete boot of the diskless computing device 110. This information populates the new boot image 166 within the virtual storage device 165 to create a boot image that corresponds to previously unknown signature value 126. In step 218, the diskless computing device 110 is halted, giving the iSCSI target 152 an opportunity to capture a snap shot of the boot image created on the virtual hard disk containing the new installation.

Figure 3:
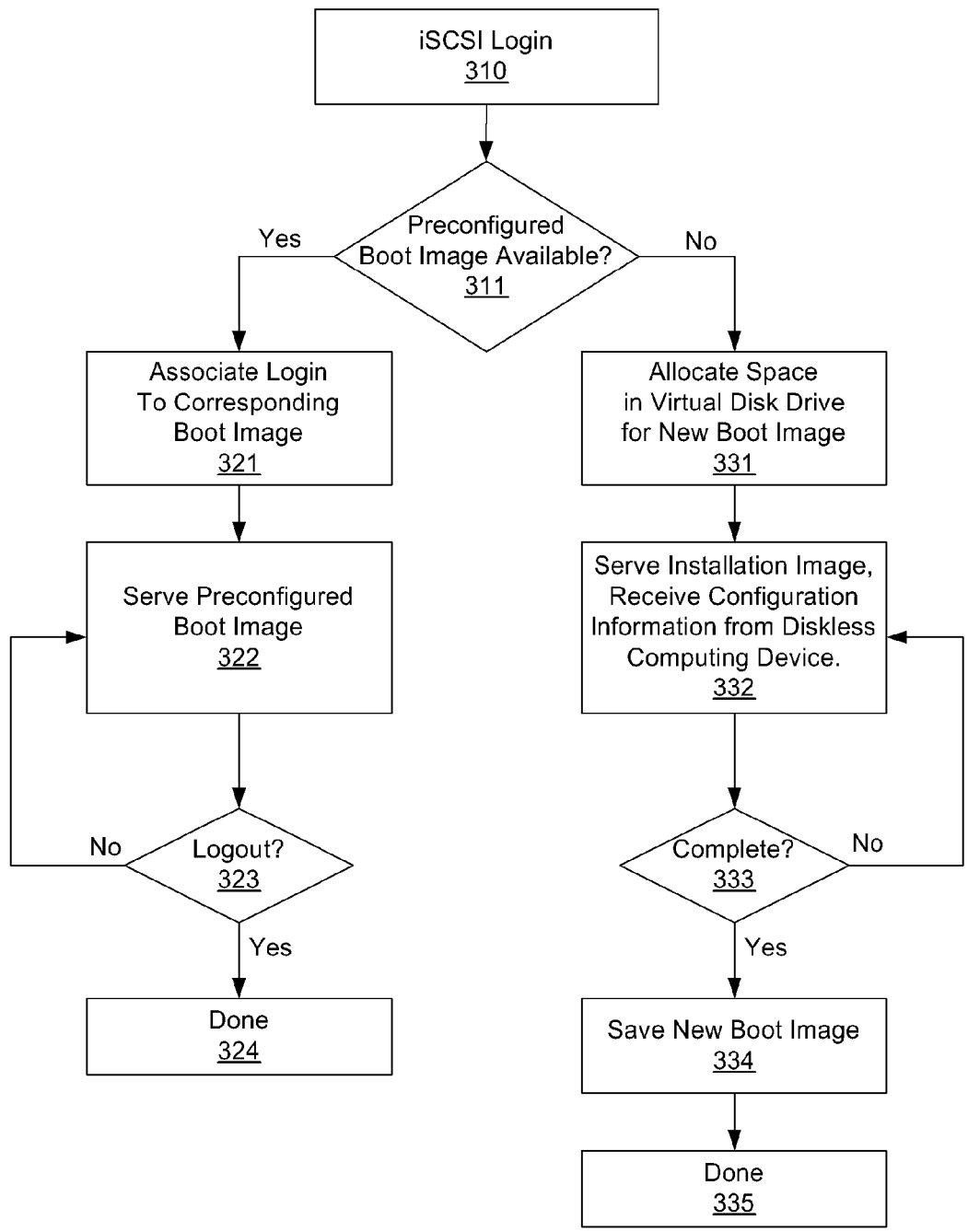
FIG. 3 is a flow diagram of method steps for serving a boot disk image for a known client hardware configuration and generating a new operating system boot image for a new client hardware configuration, according to one embodiment of the invention.

FIG. 3 is a flow diagram of method steps for serving a boot image for a known client hardware configuration and generating a new boot image for a new client hardware configuration, according to one embodiment of the invention. Although the method steps are described in conjunction with FIG. 1, persons skilled in the art will understand that any system that performs the method steps, in any order, is within the scope of the invention.

The method of FIG. 3 begins in step 310, where the iSCSI initiator 122 of diskless computing device 110 conducts an iSCSI login procedure with the iSCSI target 152 on the server computing device 140, as described above in conjunction with FIG. 2. Again, the login command from the iSCSI initiator 122 includes the signature value 126 computed by the signature generator 123 for the given hardware configuration of the diskless computing device 110.

In step 311, the iSCSI target 152 compares the signature value 126 to a set of known signature values to determine whether there is a boot image already stored in mass storage subsystem 142 of server computing device 140 that corresponds to the hardware configuration of the diskless computing device 110. If the signature value 126 is recognized, then the method proceeds to step 321, where the login command is associated with a boot image corresponding to the hardware configuration of the diskless computing device 110 already stored in mass storage subsystem 142. In step 322, all subsequent requests by the iSCSI initiator 122 within the current login session are served from the boot image corresponding to the signature value 126. In step 323, a determination is made as to whether the current session has received a logout request or has otherwise terminated. If the current session has not terminated, then the method returns to step 322, where requests from the iSCSI initiator 122 are served from the boot image corresponding to the hardware configuration of the diskless computing device 110. If a logout or other termination event occurs, terminates in step 324.

If, however, in step 311, the signature value 126 is not recognized, then the method proceeds to step 331, where a virtual disk drive 165 is created in the mass storage subsystem 142 for a new boot image 166. In step 332, the iSCSI target 152 serves the installation image 145 to the diskless computing device 110, which then proceeds through a normal installation procedure, as previously described herein. Again, in conjunction with the installation procedure, the iSCSI initiator 122 writes back to the server computing device 140 all of the configuration information, including data files, necessary to boot the diskless computing device 110. This information is stored in the new boot image 166 within the virtual disk drive 165, thereby creating a boot image that corresponds to the previously unrecognized signature value 126. In step 333, a determination is made as to whether the client device installation process has completed. If the installation process has not completed, then the server computing device 140 continues to serve the installation image 145 from the optical drive 144. If the installation process is complete, as determined in step 333, then the method proceeds to step 334, where the new boot image 166 associated with the newly encountered signature value 126 is captured and permanently stored for future reference. Once the new boot image 166 is stored, the method terminates in step 335.

Figure 4:
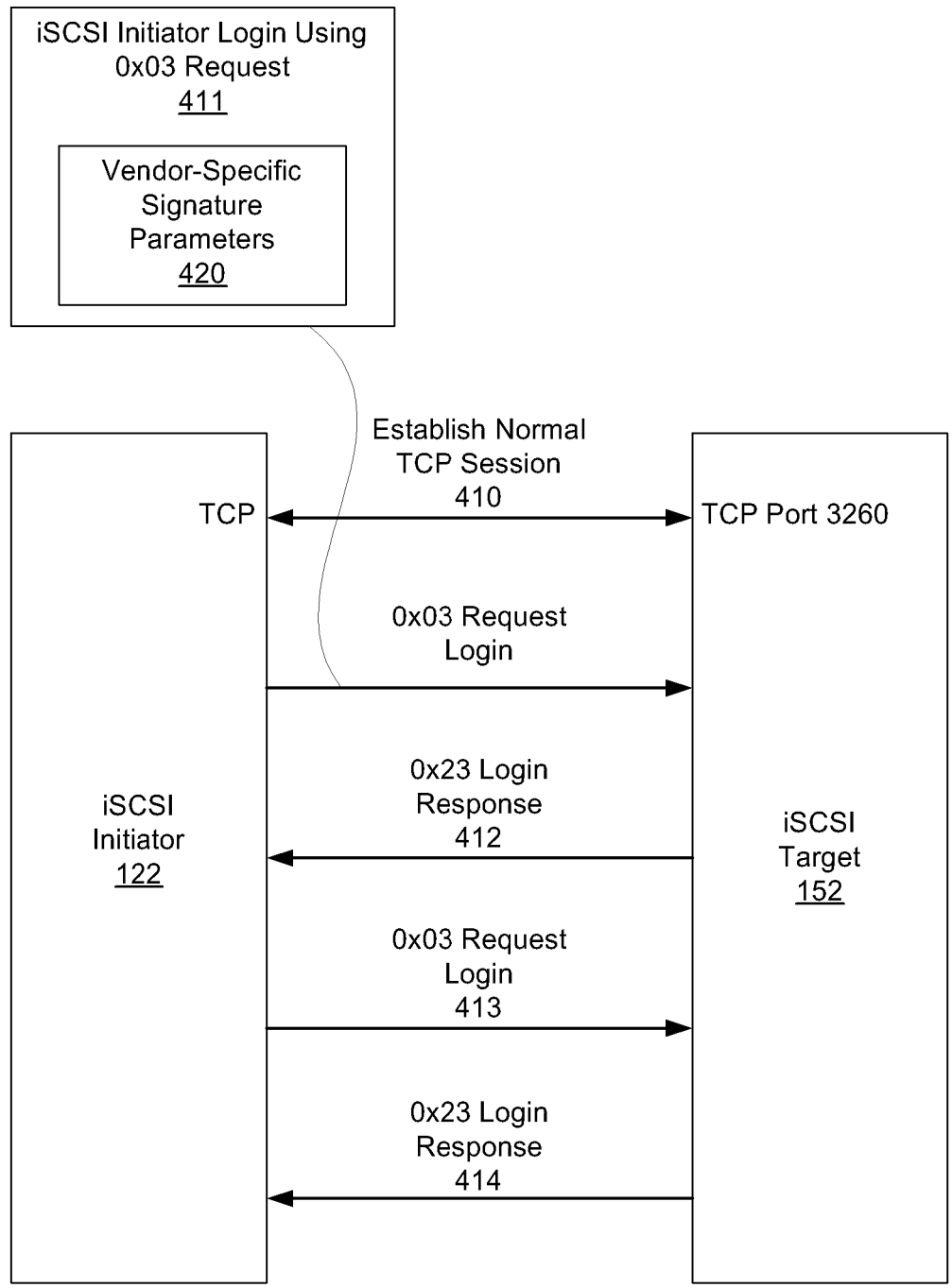
FIG. 4 illustrates an iSCSI login process, incorporating a unique signature of a client device, according to one embodiment of the invention.

FIG. 4 illustrates an iSCSI login process, incorporating the unique signature of a client device, according to one embodiment of the invention. The basic iSCSI login procedure is known in the art. The iSCSI initiator 122 establishes a normal TCP session 410 with the iSCSI target 152, using TCP port 3260. Once the TCP session is established, the iSCSI initiator 122 sends a "0x03 login request" 411 containing the vendor-specific signature parameters 420, such as the iSCSI initiator name or other login parameters. The departure from known art in the login process involves provisioning a vendor-specific login parameter to include the signature value 126. This occurs under a mechanism and standard known in the art as the "iSCSI private or public extension key format," which allows individual devices to individually define portions of their iSCSI name. A successful login results in a 0x23 login response 412 from the iSCSI target 152. Additional login exchanges may follow at this point, such as login command 413 with response 414.

Three novel elements are at work in the present invention to automate the installation and operation of a mix of diskless computing devices associated with one or more server computing devices. The first element is that of a unique signature value for each specific class of hardware configuration present in one or more diskless computing devices, such that all members of the class may boot from an identical boot image stored on a server computing device. The second element is that of the iSCSI initiator built into the firmware residing within a diskless computing device client in such a way as to provide INT13 disk services entry points to the firmware boot loader. Importantly, the iSCSI initiator inserts the unique signature value associated with the particular hardware configuration of the diskless computing device client in the iSCSI login command, as allowed by standard iSCSI private or public extension key format. The third element is that of an iSCSI target capable of parsing the iSCSI command to extract the signature value and uniquely locate or build a corresponding boot image for the diskless computing device client.

While the forgoing is directed to embodiments of the present invention, other and further embodiments of the invention may be devised without departing from the basic scope thereof, and the scope thereof is determined by the claims that follow.

We claim:

1. A method for providing boot operation and installation services to a diskless computing device, the method comprising:
    receiving a login command from the diskless computing device, wherein the login command is received by a server computing device and includes a signature value indicating a hardware configuration of the diskless computing device and that the diskless computing device is a member of a particular class of hardware;
    determining that the signature value is not recognized by comparing the signature value to a set of known signature values associated with a different class of hardware;
    selecting an installation image;
    providing only the installation image to the diskless computing device; and
    allocating memory space in the server computing device for storing a new boot image that corresponds to the signature value.

2. The method of claim 1, further comprising the steps of receiving configuration information from the diskless computing device and storing the configuration information in the memory space allocated for storing the new boot image within the server computing device.

3. The method of claim 2, further comprising the steps of generating and permanently storing the new boot image within the server computing device.

4. The method of claim 1, wherein the login command is an internet Small Computer System Interface (iSCSI) login command.

5. The method of claim 1, further comprising:
receiving a second login command from a second diskless computing device, wherein the second login command includes a second signature value indicating that the second diskless computing device is a member of the class of hardware;
determining that the second signature value is recognized by comparing the second signature value to the signature value; and
providing the new boot image to the second diskless computing device.

6. A non-transitory computer-readable storage medium that includes instructions that, when executed by a server computing device, cause the server computing device to carry out a boot operation by performing the steps of:
receiving a login command from the diskless computing device, wherein the login command is received by a server computing device and includes a signature value indicating a hardware configuration of the diskless computing device and that the diskless computing device is a member of a particular class of hardware;
determining that the signature value is not recognized by comparing the signature value to a set of known signature values associated with a different class of hardware;
selecting an installation image that corresponds to the signature value;
providing only the installation image to the diskless computing device; and
allocating memory space in the server computing device for storing a new boot image that corresponds to the signature value.

7. The computer-readable storage medium of claim 6, further comprising the steps of receiving configuration information from the diskless computing device and storing the configuration information in the memory space allocated for storing the new boot image within the server computing device.

8. The computer-readable storage medium of claim 7, further comprising the steps of generating and permanently storing the new boot image within the server computing device.

9. The computer-readable storage medium of claim 6, wherein the login command is an iSCSI login command.

10. The computer-readable storage medium of claim 8, further comprising the steps of:
receiving a second login command from a second diskless computing device, wherein the second login command includes a second signature value indicating that the second diskless computing device is a member of the class of hardware;
determining that the second signature value is recognized by comparing the second signature value to the signature value; and
providing the new boot image to the second diskless computing device.

11. A server computing device configured to providing boot operation and installation services to a diskless computing device, the server computing device comprising:
a storage subsystem;
a processing unit; and
an iSCSI target configured to:
receive a login command from the diskless computing device, wherein the login command includes a signature value indicating a hardware configuration of the diskless computing device and that the diskless computing device is a member of a particular class of hardware,
determine that the signature value is not recognized by comparing the signature value to a set of known signature values associated with a different class of hardware,
provide only an installation image to the diskless computing device, and
allocate memory space in the storage subsystem for storing a new boot image that corresponds to the signature value.

12. The server computing device of claim 11, wherein the iSCSI target is further configured to receive configuration information from the diskless computing device and to store the configuration information in the memory space allocated for storing the new boot image within the storage subsystem.

13. The server computing device of claim 12, wherein the iSCSI target is further configured to generate and permanently store the new boot image in the storage subsystem.

14. The server computing device of claim 11, wherein the login command is an iSCSI login command.

15. The server computing device of claim 13, wherein the iSCSI target is further configured to:
receive a second login command from a second diskless computing device, wherein the second login command includes a second signature value indicating that the second diskless computing device is a member of the class of hardware;
determine that the second signature value is recognized by comparing the second signature value to the signature value; and
provide the new boot image to the second diskless computing device.

* * * * *